Figure 1:
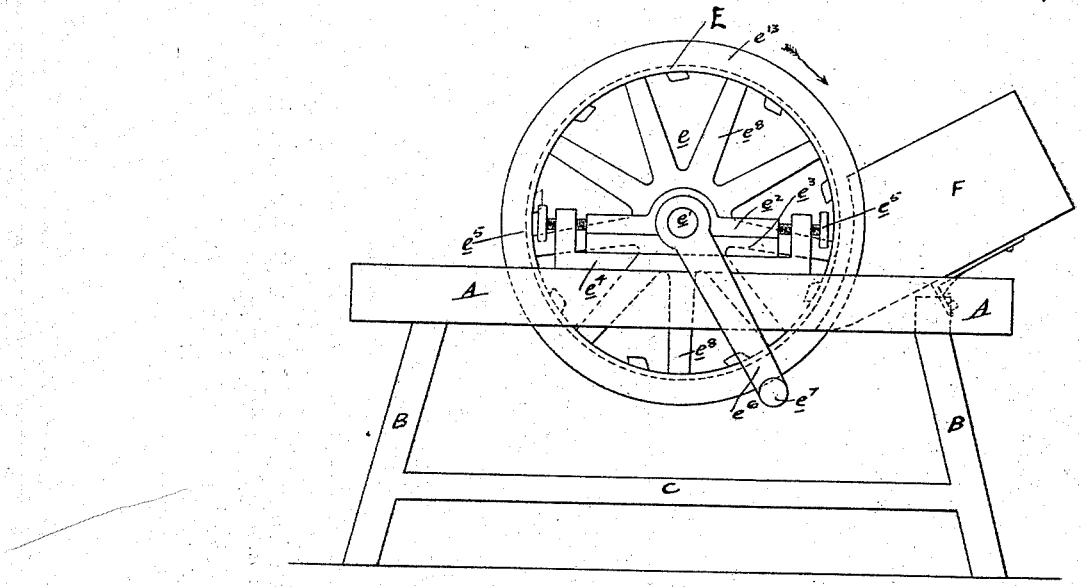

(No Model.)  2 Sheets—Sheet 1.
J. A. GOSSELIN.
CURD CUTTING MACHINE.

No. 527,420. Patented Oct. 16, 1894.

Witnesses.
James Laurin.
H. Durier.

Inventor.
Joseph Anselme Gosselin.
per: J. Emile Vanier
Attorney.

(No Model.)

J. A. GOSSELIN.
CURD CUTTING MACHINE.

No. 527,420.

2 Sheets—Sheet 2.

Patented Oct. 16, 1894.

Witnesses:

Inventor.
Joseph Anselme Gosselin.
per
Attorney.

UNITED STATES PATENT OFFICE.

JOSEPH ANSELNE GOSSELIN, OF DRUMMONDVILLE, CANADA.

CURD-CUTTING MACHINE.

SPECIFICATION forming part of Letters Patent No. 527,420, dated October 16, 1894.

Application filed June 23, 1894. Serial No. 515,623. (No model.) Patented in Canada May 21, 1894, No. 46,124.

*To all whom it may concern:*

Be it known that I, JOSEPH ANSELNE GOSSELIN, a citizen of the Dominion of Canada, residing at Drummondville, in the county of Drummond and Province of Quebec, Canada, have invented certain new and useful Improvements in Curd-Cutting Machines for Cheese Factories; and I do hereby declare the following to be a full, clear, and exact description of the invention, such as will enable others skilled in the art to which it appertains to make and use the same.

A patent for this invention has been obtained in Canada, No. 46,124, dated May 21, 1894.

My invention has reference to a curd cutting machine for cheese factories composed of a cylinder mounted on a wheel, this cylinder being provided with longitudinal cutters, which may or may not be parallel with the shaft on which it is mounted, the curded milk being brought to the cylinder by means of an inclined spout. I am aware that there exist curd cutters at present but they simply consist of vertical disks provided with radial cutters, so that when the curded milk is brought in contact with them by passing down a spout large pieces of it flow out at the side of the latter on account of the distance the spout has to be kept away from the disk.

The object of my invention is to provide a curd cutting machine of easy operation and preventing all waste of material, and also to cut the curded milk into as small pieces as desired it being a very important point especially to completely extract all the liquids remaining in the curded milk and also to permit the salt which is subsequently added to reach all points of the whole mass of curd.

Referring to the drawings similar letters refer to similar parts throughout the several views.

Figure 2:
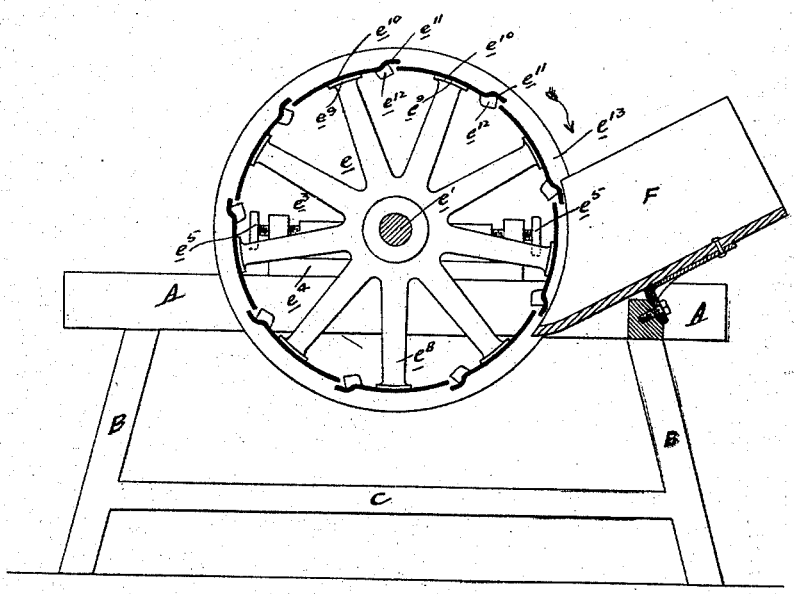
Figure 3:
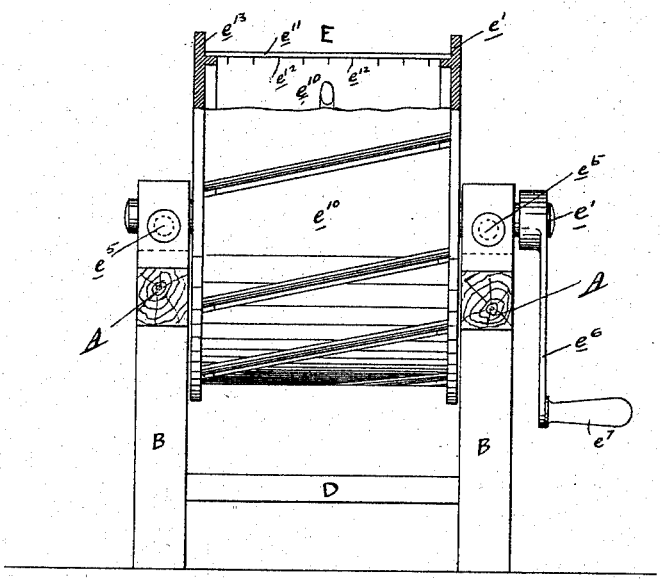

Figure 1— is a side view; Fig. 2, a vertical section of my cutter; Fig. 3, an end view.

A, B, C, and D denote the several pieces of the frame supporting my cylinder E which is the main portion of my invention and which is placed over a receptacle to receive the finely divided curded milk, and which is not shown on the drawings.

F is a spout or inclined chute which conducts the curded milk to my cutting cylinder E, which is of suitable length and mounted on the wheel $e$, placed in the center of its length, and secured to the shaft $e'$, which extends out at either end and rotates in adjustable bearings composed of two pieces $e^2$, $e^3$ joined to one another, and freely sliding on the two U shaped supports $e^4$, secured to the top piece A of the frame of my machine. The U shaped supports are provided in their upright projections with set screws $e^5$, which serve to regulate the distance of the cutting cylinder E from the end of the spout F. The shaft $e'$ is provided on one of its extremities with a crank $e^6$, $e^7$, which serves to turn the whole by hand in the direction shown by the arrows in Figs. 1 and 2.

The extremities of the spokes $e^8$ of the central wheel, are provided with small lateral projections $e^9$, onto which are secured in any suitable way distinct pieces $e^{10}$, which are curved to conform to the circumference of the cylinder E but having one of their edges projecting up as shown on the drawings at $e^{11}$ so as to form a helicoidal cutter with reference to the axis of the cylinder. These pieces $e^{10}$ are moreover secured at their two ends to circular plates or disks $e^{13}$ which form the exterior and free ends of the cylinder E through which falls out the finely cut curded milk. On the under side of the projections $e^{11}$ are placed parallel to one another and from end to end of same small knives or cutters $e^{12}$ secured to the pieces $e^{10}$ and perpendicular to $e^{11}$ and $e^{10}$.

I might here state that the circular plates $e^{13}$ extend up beyond the projections $e^{11}$ so that the end of the spout F projects in between them, and consequently no curded milk can fall out at the sides as the spout closely fits between the projections $e^{11}$.

Of course the projections $e^{11}$ can be made parallel to the shaft of the cylinder E or corrugated, or in fact form any suitable combination without changing the principle of my invention.

This machine can of course be driven by power as well as by hand, and can be made out of any suitable material.

I might here add that the inclination of the spout F can be varied at will, or again another spout placed inside the first one, so that the size of the cut pieces can be regulated, for it will be readily seen that the sharper the angle of contact between the cylinder E and the spout F the larger the pieces, for the curded milk being a semi-fluid substance, its own weight will shove more through the knives when the spout F is inclined upward than when the angle of inclination is small.

Having described my invention, what I claim, and desire to secure by Letters Patent, is—

In a curd cutting machine, the combination, with a cutting cylinder E, journaled in bearings and provided with means for revolving it, said cylinder consisting of the concavo-convex plates or pieces $e^{10}$ mounted so as to form a cylinder, there being spaces between the edges of the adjacent plates, and the said plates being provided on one face and edge with the projections $e^{11}$ and the knives $e^{12}$ each arranged on the opposite face and in the passageway between one of the said projections and the plane side of the adjacent plate, and the circular disks $e^{13}$ secured to the ends of the said plates; of means, as the chute F, for feeding material to the said cutting cylinder, substantially as described.

In testimony whereof I have affixed my signature in presence of two witnesses.

JOSEPH ANSELNE GOSSELIN.

Witnesses:
    OR GOSSELIN,
    J. D. RENÉ.